US007028134B2

(12) United States Patent
Wang et al.

(10) Patent No.: US 7,028,134 B2
(45) Date of Patent: Apr. 11, 2006

(54) CROSSBAR INTEGRATED CIRCUIT WITH PARALLEL CHANNELS FOR A COMMUNICATION DEVICE

(75) Inventors: Yuanlong Wang, San Jose, CA (US); Kewei Yang, San Jose, CA (US); Daniel Fu, Sunnyvale, CA (US); Feng Cheng Lin, Union City, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 617 days.

(21) Appl. No.: 09/750,629

(22) Filed: Dec. 28, 2000

(65) Prior Publication Data

US 2001/0025332 A1    Sep. 27, 2001

Related U.S. Application Data

(60) Provisional application No. 60/178,132, filed on Jan. 26, 2000, provisional application No. 60/178,076, filed on Jan. 25, 2000, provisional application No. 60/173,777, filed on Dec. 30, 1999.

(51) Int. Cl.
G06F 13/00    (2006.01)

(52) U.S. Cl. ................. 710/317; 710/316; 370/360

(58) Field of Classification Search ........ 710/316–317; 370/350–362, 395, 412–413, 415, 419
See application file for complete search history.

(56) References Cited

U.S. PATENT DOCUMENTS 5,920,704 A * 7/1999 Olnowich et al. .......... 709/238
6,185,221 B1 * 2/2001 Aybay ........................ 370/412
6,259,693 B1 * 7/2001 Ganmukhi et al. ......... 370/366
6,351,454 B1 * 2/2002 Crocker et al. ............. 370/235
6,392,991 B1 * 5/2002 Yamamoto et al. ......... 370/222
6,747,971 B1 * 6/2004 Hughes et al. .............. 370/387

FOREIGN PATENT DOCUMENTS

CN    1199971    11/1998

OTHER PUBLICATIONS

Mu, A.; Larson, J.; "A 9.6 gigaByte/s Throughput Plesiochronous Routing Chip" 1996, 261-266, HAL Computer Systems, Inc., Campbell, CA 95008.
Nakano, Y., "VLSI for Digital Cross-Connect Switch IN Broad-Band Access Network," 1987, Hitachi Ltd. Kokubunji, Tokyo, Japan.
N. McKeown, "A Fast Switched Backplane for a Gigabit Switched Router", Business Commmunications Review, Dec. 1997.

* cited by examiner

*Primary Examiner*—Rehana Perveen
*Assistant Examiner*—Kim T. Huynh
(74) *Attorney, Agent, or Firm*—Setter Ollila LLC

(57) ABSTRACT

Communication circuitry is comprised of processing circuitry, parallel channels, and crossbar integrated circuits. The processing circuitry exchanges the communications between communication links and the parallel channels. The parallel channels transfer the communications in parallel with a clock signal. The crossbar integrated circuits receive the communications and the clock signal over the parallel channels, switch the communications based on the clock signal, and transfer the switched communications to the parallel channels.

20 Claims, 7 Drawing Sheets

CROSSBAR INTEGRATED CIRCUIT WITH PARALLEL CHANNELS FOR A COMMUNICATION DEVICE

RELATED CASES

This application references U.S. provisional application 60/173,777, 60/178,076, and 60/178,132; respectively filed on Dec. 30, 1999, Jan. 25, 2000, and Jan. 26, 2000; all entitled "Input-Queued Crossbar-Based Protocol-Independent Switching Fabric for Switches and Routers"; and that are each hereby incorporated by reference into this application.

BACKGROUND OF THE INVENTION

1. Field of the Invention

The invention is related to the field of communications, and in particular, to crossbar integrated circuits that provide switching capability within communication devices.

2. Statement of the Problem

There is a great demand for communication devices that operate at higher and higher speeds. High-speed communications require that a synchronized clock be available throughout the communication device, so the various elements of the communication device can inter-operate properly. Unfortunately, the clock circuitry in high-speed communication devices requires excessive power and physical space.

FIG. 1 illustrates communication device 100 in the prior art. Some examples of communication device 100 include switch fabrics, switches, and routers. Communication device 100 includes communication processing circuitry 101 and crossbar integrated circuits 102–104. Communication processing circuitry 101 is coupled to incoming communication links 111 and outgoing communication links 118. Communication processing circuitry 101 is coupled to crossbar integrated circuit 102 by incoming serial channels 112 and outgoing serial channels 115. Communication processing circuitry 101 is coupled to crossbar integrated circuit 103 by incoming serial channels 113 and outgoing serial channels 116. Communication processing circuitry 101 is coupled to crossbar integrated circuit 104 by incoming serial channels 114 and outgoing serial channels 117.

Links 111 and 118 transfer communications to and from communication device 100. Links 111 and 118 could use electrical, optical, or wireless media to transfer the communications using various communication protocols. Some common protocols are Synchronous Optical Network (SONET), Asynchronous Transfer Mode (ATM), Internet Protocol (IP), Code Division Multiple Access (CDMA), and Ethernet.

Communication processing circuitry 101 exchanges the communications with links 111 and 118. Communication processing circuitry 101 also exchanges the communications with crossbar integrated circuits 102–104. Communication processing circuitry 101 handles physical layer tasks to interface with the particular type of media used by links 111 and 118. Communication processing circuitry 101 handles link layer tasks to process the particular protocols used on links 111 and 118. Communication processing circuitry 101 handles network layer tasks to properly route the communications from incoming links 111 to outgoing links 118. In response to control signals from communication processing circuitry 101, crossbar integrated circuits 102–104 switch the communications from incoming serial channels 112–114 to the proper outgoing serial channels 115–117. Crossbar integrated circuits 102–104 are silicon chips configured with controllable cross-point matrices that perform the switching.

In operation, communication processing circuitry 101 receives and processes communications from incoming links 111 to apply physical layer, link layer, and network layer functionality. Communication processing circuitry 101 transfers the communications to crossbar integrated circuits 102–104 over incoming channels 112–114. To implement routing, crossbar integrated circuits 102–104 switch the communications from incoming channels 112–114 to the proper outgoing channels 115–117. Communication processing circuitry 101 transfers the switched communications to outgoing links 118.

To provide a synchronized clock, communication processing circuitry 101 and crossbar integrated circuits 102–104 share clock information over serial channels 112–117. An individual serial channel transfers communications in a single stream of bits. Clock recovery entails analyzing the received bits to determine bit arrival times and recovering the clock based on these times. Clock encoding entails ensuring that enough transitions between logic states are present in the bits to allow for clock recovery. For serial channels 112–114, the clock information is encoded into the bits by communication processing circuitry 101 and is recovered from the bits by crossbar integrated circuits 102–104. For serial channels 115–117, the clock information is encoded into the bits by crossbar integrated circuits 102–104 and is recovered from the bits by communication processing circuitry 101. As mentioned above, the clock encoding and recovery circuitry requires excessive power and space.

FIG. 2 illustrates crossbar integrated circuit 202 in the prior art. Crossbar integrated circuit 202 includes serial channel interfaces 221–226 and crossbar matrix 240. Serial channel interfaces 221–223 are respectively coupled to incoming serial channels 231–233. Serial channel interfaces 221–223 are respectively coupled to crossbar matrix 240 by serial channels 241–243. Serial channel interfaces 224–226 are respectively coupled to outgoing serial channels 234–236. Serial channel interfaces 224–226 are respectively coupled to crossbar matrix 240 by serial channels 244–246. Crossbar matrix 240 includes cross-points that switch between incoming serial channels 241–243 and outgoing serial channels 244–246.

Serial channel interfaces 221–223 each include clock recovery circuits to recover clock information from the communications on incoming serial channels 231–233. Serial channel interfaces 224–226 each include clock encoding circuits to encode clock information into the communications on outgoing serial channels 234–236. The communication processing circuitry (not shown) on the opposite end of serial channels 231–233 includes clock encoding circuits to encode clock information into the communications on serial channels 231–233. The communication processing circuitry (not shown) on the opposite end of serial channels 234–236 includes clock recovery circuits to recover clock information from the communications on serial channels 234–236.

SUMMARY OF THE SOLUTION

The invention helps solve the above problems with communication circuitry that uses parallel channels to exchange both communications and a clock signal with crossbar integrated circuits. The clock circuitry for the parallel channels is simpler than that for serial channels. The clock circuitry for a parallel channel is shared by all of the data signals within the parallel channel. Advantageously, the simplification and sharing of the clock circuitry reduces the amount of power and physical space that is required to provide synchronized clocking. The power and space savings can be used to support higher speed communication devices.

In some examples of the invention, the communication circuitry is comprised of processing circuitry, parallel channels, and crossbar integrated circuits. The processing circuitry is configured to exchange the communications between communication links and the parallel channels. The parallel channels are configured to transfer the communications in parallel with a clock signal. The crossbar integrated circuits are configured to receive the communications and the clock signal over the parallel channels, switch the communications based on the clock signal, and transfer the switched communications to the parallel channels.

The communication circuitry may comprise a switch fabric. The communications may comprise fixed-length data packets. The communication links may comprise serial channels. The parallel channels may each be comprised of parallel differential signal pairs where one of the differential signal pairs is for the clock signal. The parallel channels may include multiplexers to perform bit slicing through the crossbar integrated circuits.

The communication processing circuitry may be comprised of virtual output queues that store the communications prior to switching and that are associated with egress ports. The virtual output queues may each be comprised of sub-queues that are each associated with a different priority. At least one of the virtual output queues may be a multi-cast virtual output queue that stores the communications prior to switching for multi-cast output.

DESCRIPTION OF THE DRAWINGS

The same reference number represents the same element on all drawings.

DETAILED DESCRIPTION OF THE INVENTION

Figure 1:
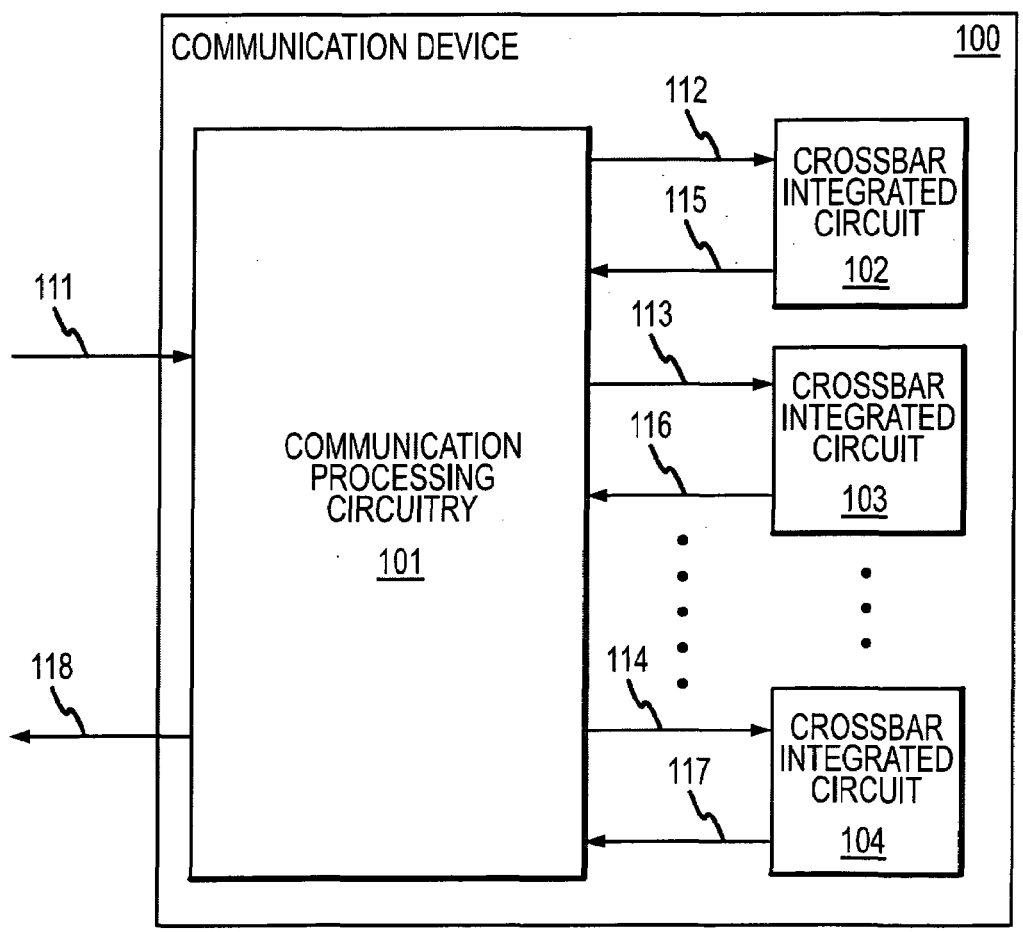
FIG. 1 illustrates a communication device in the prior art.
Figure 2:
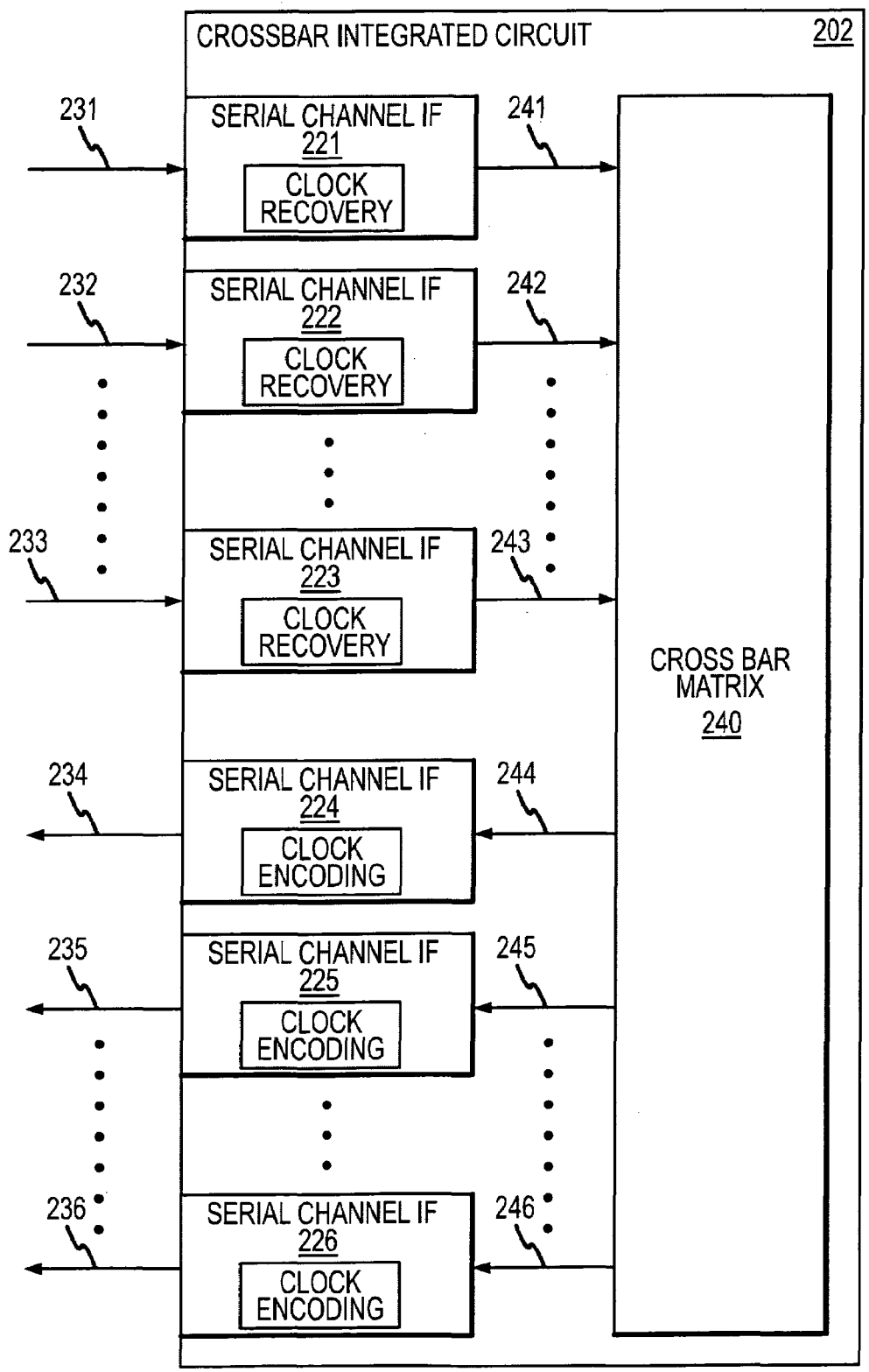
FIG. 2 illustrates a crossbar integrated circuit in the prior art.
Figure 3:
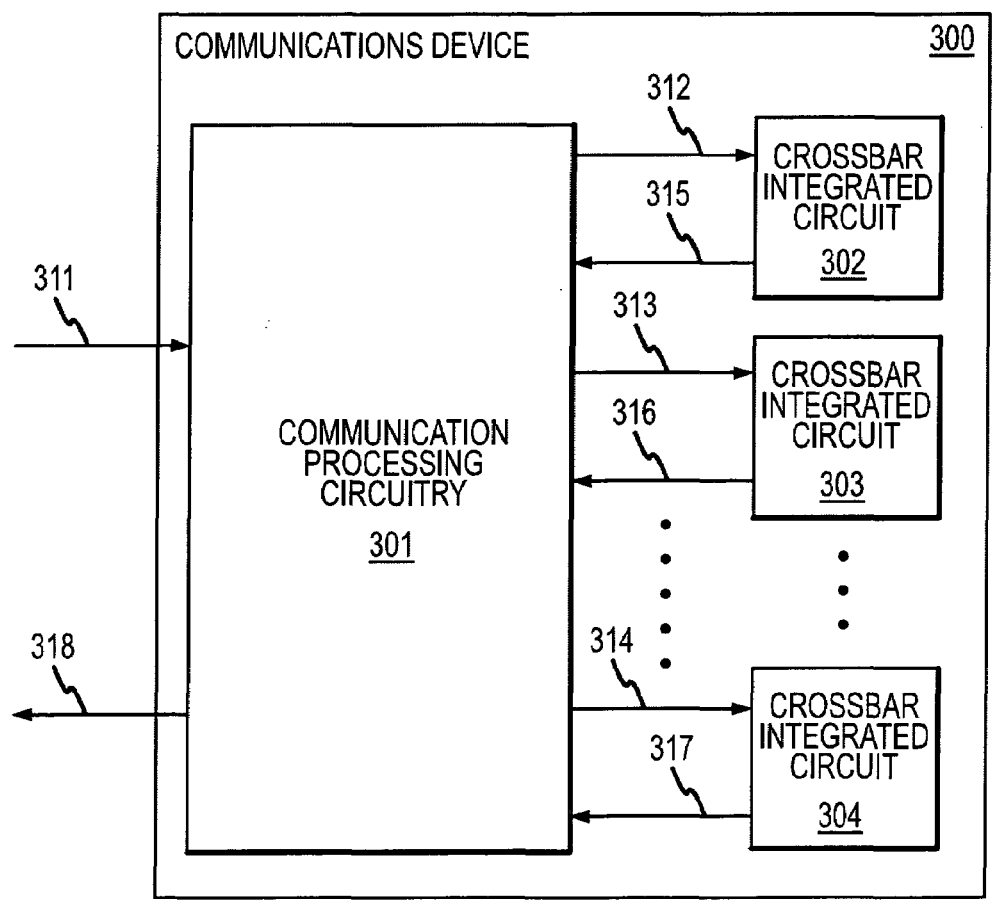
FIG. 3 illustrates a communication device in an example of the invention.

FIG. 3 illustrates communication device 300 in an example of the invention. Some examples of communication device 300 include switch fabrics, switches, and routers. Communication device 300 includes communication processing circuitry 301 and crossbar integrated circuits 302–304. Communication processing circuitry 301 is coupled to incoming communication links 311 and outgoing communication links 318. Communication processing circuitry 301 is coupled to crossbar integrated circuit 302 by incoming parallel channels 312 and outgoing parallel channels 315. Communication processing circuitry 301 is coupled to crossbar integrated circuit 303 by incoming parallel channels 313 and outgoing parallel channels 316. Communication processing circuitry 301 is coupled to crossbar integrated circuit 304 by incoming parallel channels 314 and outgoing parallel channels 317.

Links 311 and 318 transfer communications to and from communication device 300. Links 311 and 318 could use electrical, optical, or wireless media to transfer the communications using various communication protocols. Some common protocols are Synchronous Optical Network (SONET), Asynchronous Transfer Mode (ATM), Internet Protocol (IP), Code Division Multiple Access (CDMA), and Ethernet.

Communication processing circuitry 301 exchanges the communications with links 311 and 318. Communication processing circuitry 301 also exchanges the communications with crossbar integrated circuits 302–304. Communication processing circuitry 301 handles physical layer tasks to interface with the particular type of media used by links 311 and 318. Communication processing circuitry 301 handles link layer tasks to process the particular protocols used on links 311 and 318. Communication processing circuitry 301 handles network layer tasks to properly route the communications from incoming links 311 to outgoing links 318. In response to control signals from communication processing circuitry 301, crossbar integrated circuits 302–304 switch the communications from incoming parallel channels 312–314 to the proper outgoing parallel channels 315–317. Crossbar integrated circuits 302–304 are silicon chips configured with controllable cross-point matrices that perform the switching.

In operation, communication processing circuitry 301 receives and processes communications from incoming links 311 to apply physical layer, link layer, and network layer functionality. Communication processing circuitry 301 transfers the communications to crossbar integrated circuits 302–304 over incoming parallel channels 312–314. To implement routing, crossbar integrated circuits 302–304 switch the communications from incoming parallel channels 312–314 to the proper outgoing parallel channels 315–317. Communication processing circuitry 301 transfers the switched communications to outgoing links 318.

To provide a synchronized clock, communication processing circuitry 301 and crossbar integrated circuits 302–304 share clock information over parallel channels 312–317. An individual parallel channel transfers communications in multiple parallel bit streams. The parallel channel also transfers a clock signal in a separate bit stream that is parallel to the bit streams for the communications.

The clock recovery circuitry for parallel channels is simpler than that for serial channels. The clock recovery circuitry for a parallel channel is shared by all of the parallel data signals within the parallel channel. Advantageously, the simplification and sharing of the clock recovery circuitry reduces the amount of power and physical space that is required to provide synchronized clocking.

Figure 4:
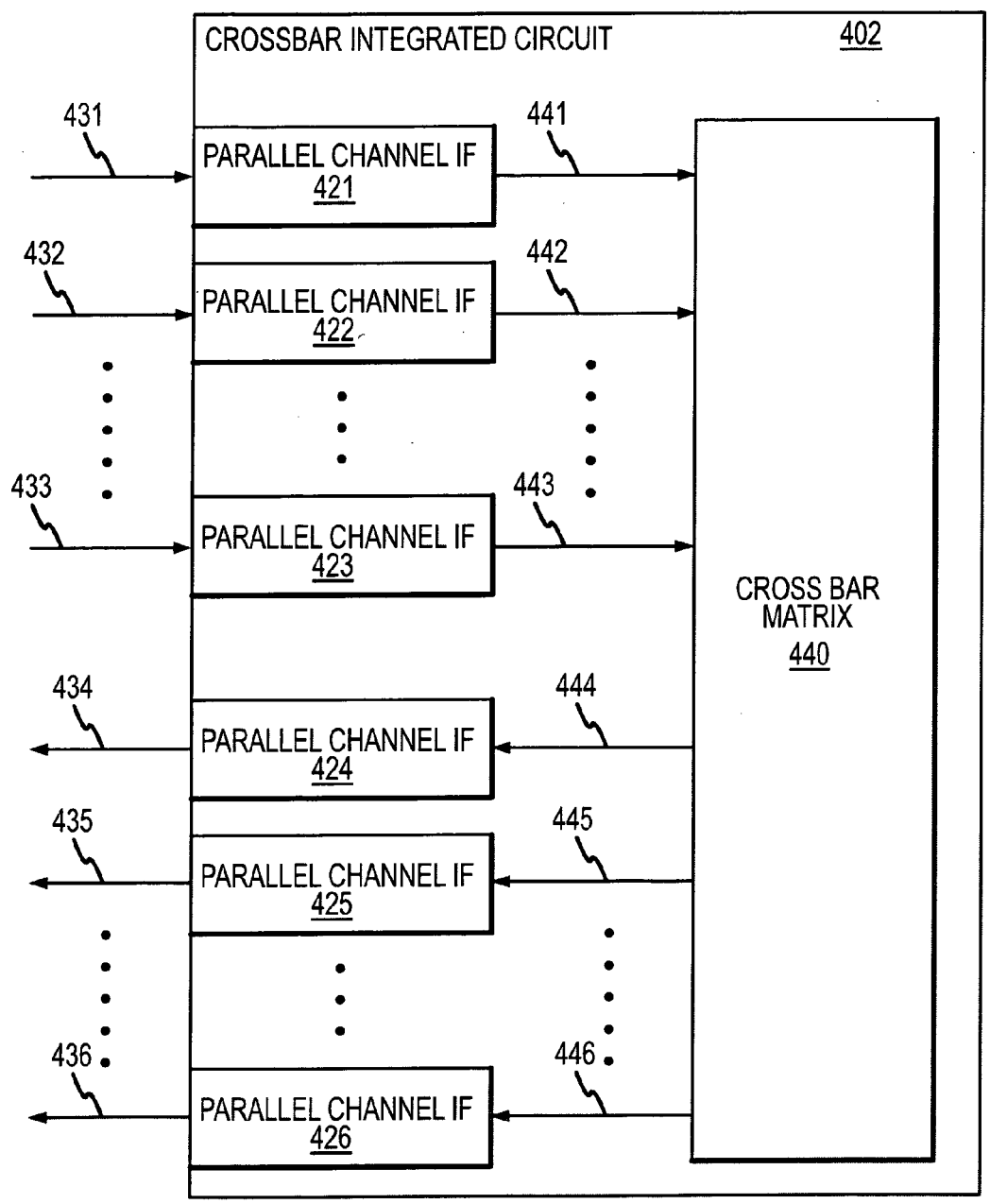
FIG. 4 illustrates a crossbar integrated circuit in an example of the invention.

FIG. 4 illustrates crossbar integrated circuit 402 in an example of the invention. Crossbar integrated circuit 402 includes parallel channel interfaces 421–426 and crossbar matrix 440. Parallel channel interfaces 421–423 are respectively coupled to incoming parallel channels 431–433. Parallel channel interfaces 421–423 are respectively coupled to crossbar matrix 440 by parallel channels 441–443. Parallel channel interfaces 424–426 are respectively coupled to outgoing parallel channels 434–436. Parallel channel interfaces 424–426 are respectively coupled to crossbar matrix 440 by parallel channels 444–446. Crossbar matrix 440 performs the switching between incoming parallel channels 441–443 and outgoing parallel channels 444–446. Each parallel channel transfers a separate clock signal in parallel with the communications on the channel.

Figure 5:
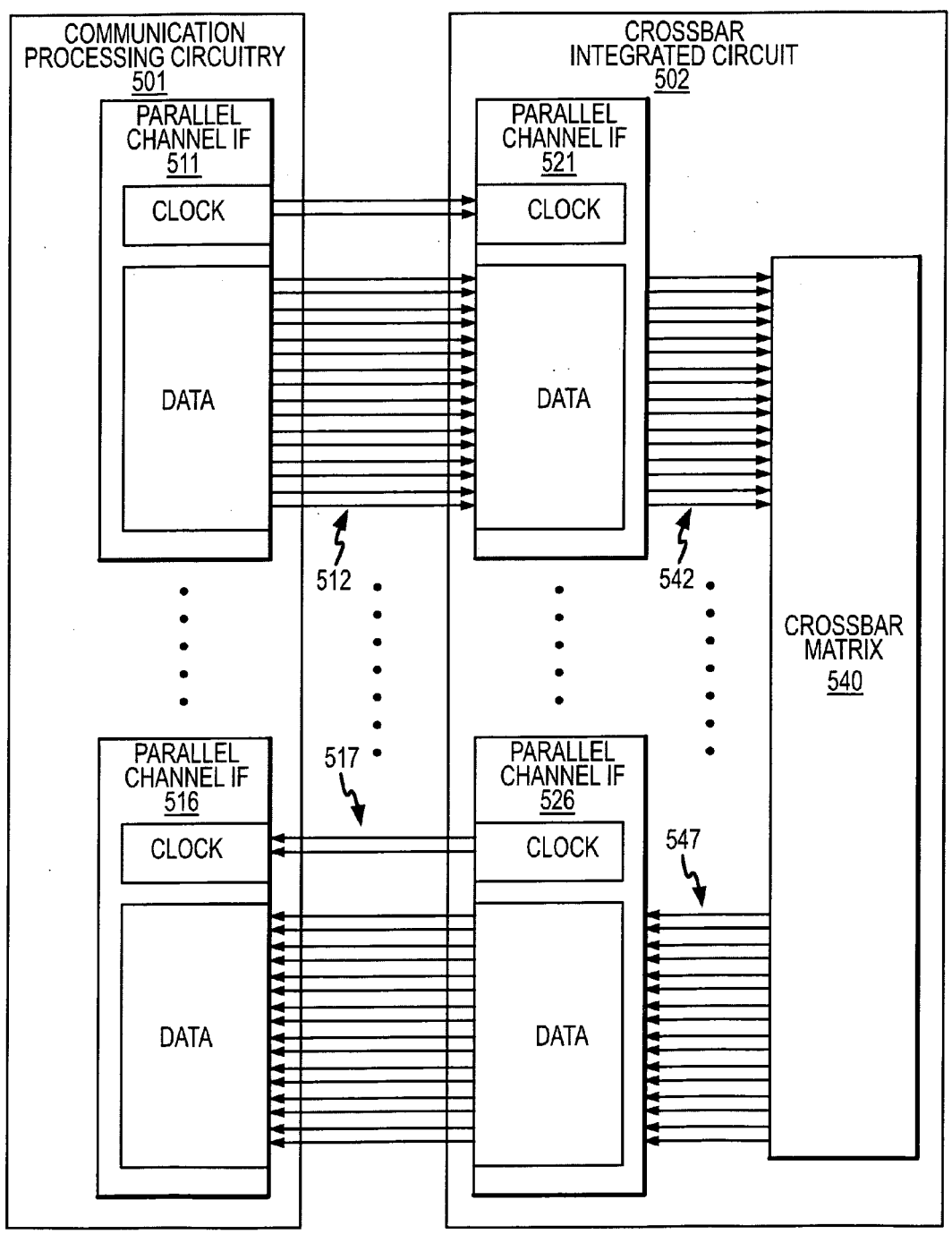
FIG. 5 illustrates parallel channels in an example of the invention.

FIG. 5 illustrates parallel channels 512 and 517 in an example of the invention. Communication processing circuitry 501 includes parallel channel interfaces 511 and 516. Crossbar integrated circuit 502 includes parallel channel interfaces 521 and 526, and also includes crossbar matrix 540. Parallel channel interfaces 521 and 526 each include a clock portion and a data portion. Parallel channel interfaces 521 and 526 are respectively coupled to crossbar matrix 540 by parallel channels 542 and 547. Parallel channel 512 couples parallel channel interfaces 511 and 521. Parallel channel 517 couples parallel channel interfaces 516 and 526. Additional parallel channels and interfaces are represented but not shown for clarity.

Parallel channel 512 includes nine signal pairs to transfer nine differential signals. One of these signal pairs transfers a differential clock signal from communication processing circuitry 501 to crossbar integrated circuit 502. The other eight signal pairs transfer eight differential data signals from communication processing circuitry 501 to crossbar integrated circuit 502.

Parallel channel 517 includes nine signal pairs to transfer nine differential signals. One of these signal pairs transfers a differential clock signal from crossbar integrated circuit 502 to communication processing circuitry 501. The other eight signal pairs transfer eight differential data signals from crossbar integrated circuit 502 to communication processing circuitry 501.

Typically, there are multiple incoming parallel channels like channels 512 and 542 with corresponding parallel channel interfaces. There are also typically multiple outgoing parallel channels like channels 517 and 547 with corresponding parallel channel interfaces. Crossbar matrix 540 switches the differential data signals from the incoming parallel channels to the outgoing parallel channels as directed by communication processing circuitry 501.

In some examples of the invention, there are 16 incoming parallel channels and 16 outgoing parallel channels that each operate at 1.6 gigabits per signal pair per second. The parallel channel interfaces may be configured to operate off of the synchronous clock of their respective circuits. The parallel channel interfaces may be configured to perform error correction and exchange control information. The parallel channel interfaces may be configured to transfer packets by transferring each byte of the packet in eight parallel bits on the eight respective differential signals.

Figure 6:
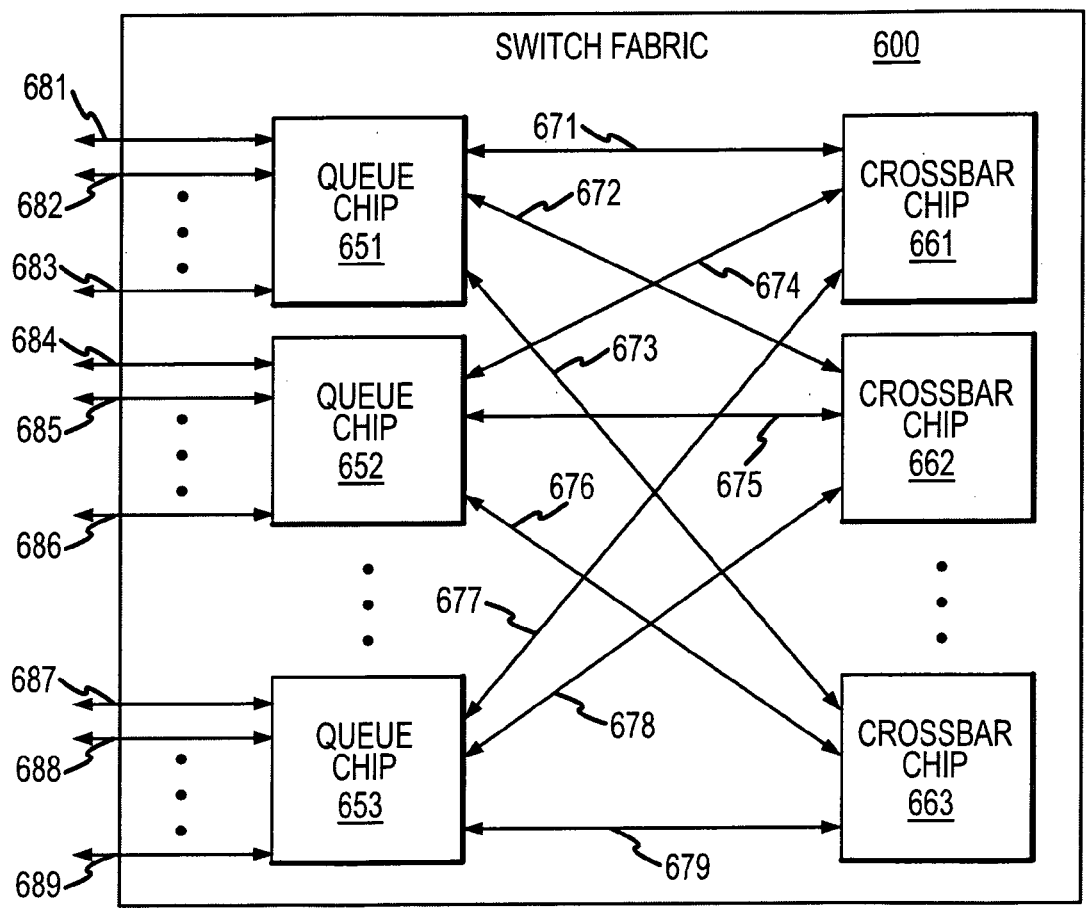
FIG. 6 illustrates a switch fabric in an example of the invention.

FIG. 6 illustrates switch fabric 600 in an example of the invention. Switch fabric 600 performs fixed length packet switching with a combined input output queued crossbar architecture that is protocol independent and scalable. Scalability is achieved by changing the numbers of chips. Switch fabric 600 includes queue chips 651–653, crossbar chips 661–663, parallel channels 671–679, and serial channels 681–689. Chips 651–653 and 661–663 are application specific integrated circuits with integrated CMOS transceivers.

There are 16 queue chips although only queue chips 651–653 are shown for clarity. Each queue chip is coupled to 16 serial channels, although only serial channels 681–689 are shown for clarity. The serial channels are typically coupled to line cards or network processors (not shown). There are 8 crossbar chips although only crossbar chips 661–663 are shown for clarity. Although only parallel channels 671–679 are shown for clarity, each queue chip is coupled to 8 parallel channels—one parallel channel to each crossbar chip—and each crossbar chip is coupled to 16 parallel channels—one parallel channel to each queue chip.

Each serial channel operates at 2.5 Gigabits Per Second (GPS) and can drive 30 meters of cable with a single differential pair. There are four signal wires per serial channel transceiver. The serial channels can support two OC-192 connections with eight serial channels per OC-192 connection, or the serial channels can support eight OC-48 connections by externally multiplexing four OC-48 connections to eight serial channels. One example of suitable transceivers for the serial channels is the SkyRail channel supplied by HotRail Inc. of San Jose, Calif.

Each parallel channel has five differential pairs each operating at 1.6 GPS for operation at 8 GPS per parallel channel. Each parallel channel transceiver uses 24 signal pins and 6 power and ground pins and can drive 39 inches of 50 ohm printed circuit board trace. The parallel channel transceivers do not require external resistors. Each parallel channel transceiver has a built-in self-calibration circuit that optimizes the data transfer rate and corrects up to 1.2 nanosecond line-to-line data skew. The latency through a parallel channel is less than eight nanoseconds because there is no data encoding/decoding. One example of suitable transceivers for a parallel channel is the LiteRail channel supplied by HotRail Inc. of San Jose, Calif.

Each queue chip has queues that are comprised of static random access memory with 80 GPS at ingress. The queues are managed by adaptive dynamic threshold algorithms for better adaptation to different traffic patterns. Each queue chip has 64 unicast virtual output queues and two multicast virtual output queues that are shared by the serial channel ingress ports. The virtual output queues store the packets prior to switching and are each associated with a particular egress port. Each queue chip has eight unicast output queues—one for each serial channel egress port—and 2 multicast output queues for all of the serial channel egress ports. The output queues use shared memory.

Each queue has eight sub-queues for eight different priorities. Placing a packet in a particular sub-queue assigns the packet to the corresponding priority. Priorities allow packets with different priorities to be handled differently. For example, a new packet having top priority may be processed before an older packet having a lower priority.

Packets from the serial channel ingress ports are buffered in the virtual output queues. Each queue chip has an ingress scheduler between the virtual output queues and the parallel channels. The ingress scheduler uses a round robin algorithm to transfer requests for the virtual output queues over the parallel channels to the crossbar chips. In response to the requests, the ingress scheduler receives grants from the crossbar chips. In response to the grants, the ingress scheduler uniformly transfers packets from the virtual output queues over the parallel channels to the crossbar chips. The crossbar chips switch the packets back to the proper parallel channels for buffering in the proper output queues. Each queue chip has an egress scheduler between the output queues and the serial channel egress ports. The ingress scheduler uses a strict priority or weighted round robin algorithm to transfer packets from the output queues over the serial channel egress ports. The ingress scheduler can reset its scheduler pointers to random values.

Each crossbar chip operates in parallel with the other crossbar chips. Each crossbar chip operates at one-half of the communication link rate and has a speed-up greater than one—typically two. Each crossbar chip has an internal capacity of 3.2× the communication link rate where 2× the communication link rate is for user data and 1.2 times the communication link rate is used for control information. At a 10 GPS communication link rate, the packet time is 100 nanoseconds with a speed-up of two. Each crossbar chip is non-buffered and has an internal scheduler that supports multicasting.

Figure 7:
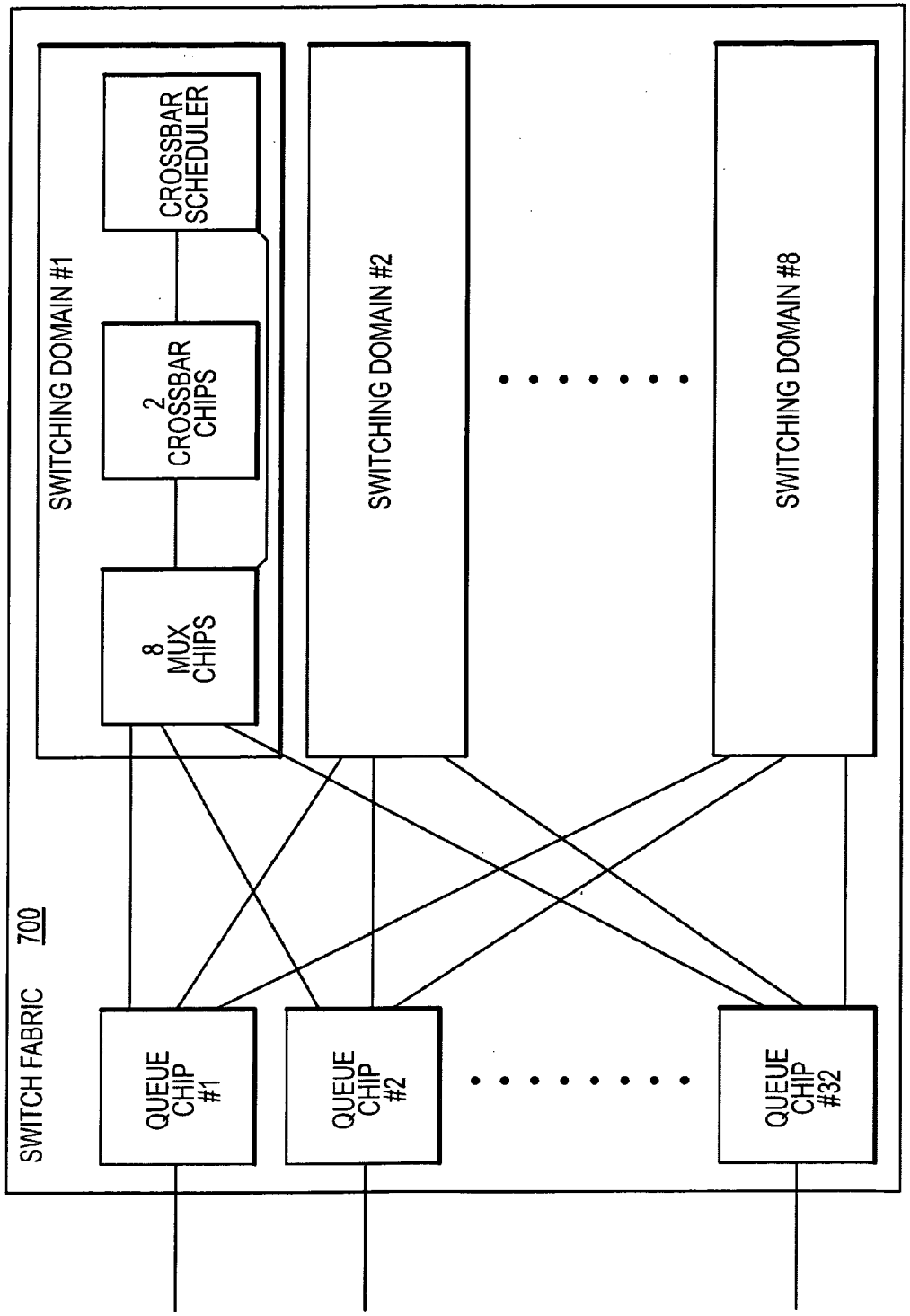
FIG. 7 illustrates a switch fabric in an example of the invention.

FIG. 7 illustrates switch fabric 700 in an example of the invention. Switch fabric 700 is similar to switch fabric 600 with the following modifications. There are eight independent switching domains that each have eight mux chips, two crossbar chips, and one crossbar scheduler. There are 32 queue chips each connected to 16 serial channels. Each queue chip is connected by a parallel channel to one of the mux chips in each switching domain. Queue chips 1–4 are connected to the first mux chip in each switching domain, queue chips 5–8 are connected to the second mux chip in each switching domain, and so on, until queue chips 29–32 are connected to the eighth mux chip in each switching domain. The mux chips perform bit slicing and protocol conversion between the queue chips and the crossbar chips. Each mux chip in a switching domain is connected to the crossbar chips by four parallel channels. The crossbar scheduler is coupled to the mux chips and the crossbar chips by parallel channels.

FIGS. 3–7 and the above description depict specific examples of communications devices and circuitry in accord with the present invention. Those skilled in the art will appreciate that some conventional aspects of the communications devices and circuitry have been simplified or omitted for clarity. Those skilled in the art will appreciate that the features described above could be combined in various ways to form multiple variations of the invention. Those skilled in the art will appreciate variations of the communications devices and circuitry that fall within the scope of the invention. As a result, the invention is not limited to the specific examples described above, but only by the following claims and their equivalents.

What is claimed is:

1. Communication circuitry comprising:
    a processing circuitry configured to receive a communication from a communication link;
    a plurality of crossbar integrated circuits; and
    a plurality of parallel channels between the processing circuitry and each crossbar integrated circuit of the plurality of crossbar integrated circuits, with the plurality of parallel channels of a particular crossbar integrated circuit being configured to transfer the communication and a clock signal in parallel to the particular crossbar integrated circuit.

2. The communication circuitry of claim 1 wherein the plurality of parallel channels is comprised of parallel differential signal pairs and wherein one of the differential signal pairs is for the clock signal.

3. The communication circuitry of claim 1 wherein the communication link comprises a serial channel.

4. The communication circuitry of claim 1 wherein the communication comprises a data packet.

5. The communication circuitry of claim 1 wherein the communication comprises a fixed-length data packet.

6. The communication circuitry of claim 1 wherein the communication circuitry comprises a switch fabric.

7. The communication circuitry of claim 1 wherein the processing circuitry is comprised of at least one virtual output queue that stores the communication prior to switching and that is associated with an egress port.

8. The communication circuitry of claim 1 wherein the processing circuitry is comprised of at least one virtual output queue that stores the communication prior to switching and wherein a virtual output queue is comprised of sub-queues that are each associated with a particular priority.

9. The communication circuitry of claim 1 wherein the processing circuitry is comprised of a multi-cast virtual output queue that stores the communication prior to switching for multi-cast output.

10. The communication circuitry of claim 1 wherein the plurality of parallel channels include multiplexers to perform bit slicing through the crossbar integrated circuits.

11. A method of operating communication circuitry, the method comprising:
    receiving a communication in a processing circuitry from a communication link;
    transferring the communication and a clock signal in parallel over a plurality of parallel channels to a particular crossbar integrated circuit of a plurality of crossbar integrated circuits; and
    switching the communication in the particular crossbar integrated circuit based on the clock signal.

12. The method of claim 11 wherein transferring the communication and the clock signal in parallel over the plurality of parallel channels comprises transferring the communication and the clock signal over parallel differential signal pairs.

13. The method of claim 11 wherein transferring the communication and the clock signal in parallel over the plurality of parallel channels comprises transferring the communication and the clock signal over parallel differential signal pairs wherein one of the differential signal pairs is for the clock signal.

14. The method of claim 11 wherein the communication comprises a data packet.

15. The method of claim 11 wherein the communication comprises a fixed-length data packet.

16. The method of claim 11 wherein the communication circuitry comprises a switch fabric.

17. The method of claim 11 further comprising, in the processing circuitry, storing the communication in a virtual output queue that is associated with an egress port prior to switching.

18. The method of claim 11 further comprising, in the processing circuitry, storing the communication in a virtual output sub-queue that is associated with a particular priority.

19. The method of claim 11 further comprising, in the processing circuitry, storing the communication in a multi-cast virtual output queue tat stores the communication prior to switching for multi-cast output.

20. The method of claim 11 wherein transferring the communication and the clock signal in parallel comprises multiplexing the communications to perform bit slicing through the crossbar integrated circuits.

* * * * *